United States Patent
Kusano et al.

(10) Patent No.: US 6,709,072 B2
(45) Date of Patent: Mar. 23, 2004

(54) HYDRAULIC BRAKE SYSTEM FOR VEHICLES

(75) Inventors: Akihito Kusano, Asahi-machi (JP); Tetsuya Kuno, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/438,018

(22) Filed: May 15, 2003

(65) Prior Publication Data

US 2003/0214177 A1 Nov. 20, 2003

(30) Foreign Application Priority Data

May 16, 2002 (JP) .................................. 2002-141542

(51) Int. Cl.$^7$ ............................................. B60T 8/00
(52) U.S. Cl. ........................ 303/113.4; 303/113.1; 303/122.11; 303/166; 303/DIG. 4; 188/358
(58) Field of Search ..................... 303/113.4, 122.11, 303/113.1, 114.1, 166, DIG. 3, DIG. 4, 11, 119.1, 116.1–116.2, 117.1; 188/358, 359; 60/545; 701/70

(56) References Cited

U.S. PATENT DOCUMENTS 4,557,528 A 12/1985 Leiber
6,557,950 B2 * 5/2003 Ishida et al. .................. 303/20
2003/0090149 A1 * 5/2003 Kusano et al. ............... 303/191

FOREIGN PATENT DOCUMENTS

JP 59-130769 A 7/1984

* cited by examiner

*Primary Examiner*—Douglas C. Butler
(74) *Attorney, Agent, or Firm*—Burns, Doane, Swecker & Mathis, L.L.P.

(57) ABSTRACT

In a vehicle hydraulic brake system of a type adapted to release brake fluid discharged from the wheel cylinders into a reservoir for a master cylinder during pressure reduction phase of antilock brake control or vehicle stability control, the volume of the pressure chamber of the master cylinder can decrease until it becomes impossible to further increase pressure as a result of repeated pressure increase and reduction. An inexpensive solution to this problem is provided. The solution includes means for estimating the amount of pressure increase and/or pressure reduction of the wheel cylinders, and solenoid valves provided in a line connecting a pressure source with the master cylinder pressure chamber and adapted to be opened for a calculated time period.

10 Claims, 6 Drawing Sheets

HYDRAULIC BRAKE SYSTEM FOR VEHICLES

BACKGROUND OF THE INVENTION

This invention relates to an inexpensive hydraulic brake system for vehicles that permit antilock brake control and vehicle stability control.

A vehicle hydraulic brake system with which antilock brake control (ABS) and vehicle stability control (VSC) are possible includes a hydraulic pressure source having a power pump for generating a predetermined hydraulic pressure, a master cylinder for generating hydraulic pressure corresponding to a force applied to the brake by a driver and/or the operation of automatic pressurizing means, wheel cylinders actuated by the hydraulic pressure applied from the master cylinder for applying braking force to the vehicle wheels, and wheel cylinder pressure control valves disposed in hydraulic lines that connect the master cylinder to the wheel cylinders, for adjusting pressure in the wheel cylinders.

Also known is a brake system to which is further added a pressure adjusting valve for adjusting the hydraulic pressure supplied from the hydraulic pressure source to a value corresponding to the brake operation and/or actuation of the automatic pressurizing means.

These hydraulic brake devices include a controller (that is, electronic control unit) that judges the necessity of wheel cylinder pressure adjustment based on the information from various sensors including wheel speed sensors, and if such adjustment is determined to be necessary, controls the wheel cylinder pressure control valves. For example, if it judges it necessary to reduce the pressure of the wheel cylinders, the controller will activate the wheel cylinder pressure control valves to close the hydraulic pressure supply lines to the wheel cylinders and open the discharge lines from the wheel cylinders.

The pressures in the wheel cylinders thus fall. Brake fluid discharged from the wheel cylinders is released into the atmospheric reservoir. That is, during every pressure reduction phase of such electronic brake control, i.e. computer-controlled brake operation, brake fluid is discharged into the reservoir, so that the piston of the master cylinder (hereinafter simply "master piston") gradually advances until it abuts the end wall of the cylinder. Once the master piston abuts the cylinder end wall, it is impossible to supply brake pressure any more from the master cylinder to the wheel cylinder.

The hydraulic brake system disclosed in Japanese patent publication 59-130769 has a hydraulic pressure supply means for introducing the pressure fluid from the pressure adjusting valve into the hydraulic line connecting the master cylinder with the wheel cylinders, if part of fluid in the above hydraulic line is lost and the amount of the fluid in this line is determined to be insufficient.

The hydraulic brake system disclosed in this publication includes a solenoid valve for closing the line connecting the hydraulic pressure supply means to the master cylinder, and/or a switch (stroke sensor) for monitoring the stroke of the master piston.

Once hydraulic pressure is supplied from a pressure adjusting valve into the hydraulic line connecting the master cylinder with the wheel cylinders, the difference between the pressure in a pressure chamber which is applied to the master piston in such a direction as to advance the piston and the pressure in the pressure chamber in the master cylinder (hereinafter "master pressure chamber") will disappear, so that no pressure acts on the piston to retract it. Since the pressure difference is gone, unless any means for checking the retraction of the master piston is provided, the master cylinder would be pushed back under the force of the return spring to a position where the master pressure chamber communicates with the master cylinder reservoir. If this happens, the pressure output of the master cylinder will disappear.

Thus, the above publication proposes to close the line leading to the master cylinder with a solenoid valve to prevent the hydraulic pressure supplied through the hydraulic pressure supply means from flowing into the master hydraulic pressure chamber. In another embodiment, this publication proposes to detect the position of the master piston to temporarily stop the supply of brake fluid from the pressure adjusting valve before the master piston returns to a position where the master pressure chamber re-communicates with the reservoir for the master cylinder.

The hydraulic brake system disclosed in the Japanese patent publication 59-130769 needs expensive elements, such as a solenoid valve for closing the line between the master cylinder and the hydraulic pressure supply means and/or a sensor for monitoring the stroke of the master piston.

Another conventional brake system is adapted to release brake fluid discharged from the wheel cylinders into a low-pressure reservoir, draw up brake fluid in the low-pressure reservoir by means of a power pump and return the thus sucked up brake fluid into a line between the master cylinder and a master cylinder pressure control valve. This type of brake system requires another power pump for returning brake fluid in addition to a power pump used in the hydraulic pressure source. This pushes up the cost of the entire system.

An object of this invention is to provide an inexpensive hydraulic brake system for vehicles which permits antilock brake control, vehicle stability control and other electronic brake control.

SUMMARY OF THE INVENTION

According to this invention, there is provided a vehicle hydraulic brake system comprising a hydraulic pressure source for generating a predetermined hydraulic pressure, a pressure adjusting valve for adjusting the hydraulic pressure supplied from the hydraulic pressure source to a value corresponding to a brake operation and/or an automatic brake control, a master cylinder for generating hydraulic pressure according to brake operation and/or automatic brake control, wheel cylinders activated by the output pressure from the master cylinder to apply braking force to wheels of the vehicle, wheel cylinder pressure control valves provided in a hydraulic line connecting the master cylinder to the wheel cylinders for adjusting the hydraulic pressure in the wheel cylinders, characterized in that there are provided means for estimating the amount of pressure increase and/or pressure reduction adjusted by the wheel cylinder pressure control valves, and a hydraulic pressure supply unit for supplying hydraulic pressure output of the pressure adjusting valve into a hydraulic line connecting the master cylinder to the wheel cylinder pressure control valve according to the estimated amount of pressure increase and/or pressure reduction.

Instead of the pressure output of the pressure adjusting valve, the pressure output of the hydraulic pressure source may be supplied into the hydraulic line. In this case, a pressure adjusting valve may or may not be provided.

Hydraulic pressure may be supplied into the hydraulic line while the master cylinder has still enough room for further increasing or decreasing pressure. But this will unnecessarily increase the number of times hydraulic pressure is supplied. Thus, hydraulic pressure is preferably supplied only if the piston of the master cylinder has advanced near to its limit.

Hydraulic pressure may be supplied into the hydraulic line so that the piston of the master cylinder will move to a point near its initial position or to a predetermined position. The "point near an initial position" refers to a point which is near the initial position but where the communication between the master pressure chamber and the reservoir for the master cylinder will not restart. The "predetermined position" refers to a predetermined point in the stroke of the piston.

The means for estimating the amount of pressure increase may be of a type which estimates the amount of pressure increase from the pressure increase time period during which pressure is increased, or from the pressure increase time and the differential pressure between the pressure output from the master cylinder (which may be estimated from any pressure associated with the master cylinder pressure output or the brake operating force) and the wheel cylinder pressure (which may be estimated from the amount of pressure increase or reduction, deceleration of the vehicle, or deceleration of the wheels). It may be in the form of a logic circuit provided in the controller.

The means for estimating the amount of pressure reduction may be of a type which estimates the amount of pressure reduction from the pressure reduction time period during which pressure is reduced, or from the wheel cylinder pressure and the pressure reduction time period. This means, too, may be a logic circuit in the controller.

The hydraulic pressure supply unit may be formed by combining a solenoid valve for opening and closing the hydraulic pressure supply line extending from the pressure adjusting valve or the hydraulic pressure source, with a logic circuit in the controller which opens the solenoid valve if the estimated amount of pressure increase and/or the estimated amount of pressure reduction exceeds a threshold to supply brake fluid into the above-described hydraulic line, calculates the amount of brake fluid supplied from the time period during which the solenoid valve is open, or the differential pressure between the pressure of the brake fluid supplied and the pressure output of the master cylinder and the time period during which the solenoid valve is open, and closes the solenoid valve when a predetermined amount of brake fluid has been supplied into the hydraulic line.

By estimating the amount of pressure increase and/or pressure reduction and calculating the amount of brake fluid supplied, it is possible to estimate the position of the master piston and control the amount of brake fluid supplied without using a stroke sensor. This pushes down the cost of the system.

According to the present invention, since the amount of pressure increase and/or pressure reduction of the wheel cylinders are estimated and the fluid pressure supplied from the pressure adjusting valve or the fluid pressure source is introduced into the fluid line between the master cylinder and the wheel cylinder pressure control valve, a solenoid valve for shutting off the master cylinder from the fluid pressure supply unit or a sensor for monitoring the stroke of the master piston is needed any more. This cuts down the cost of the entire brake system.

There may be a difference between the estimated amount of pressure increase and/or pressure reduction and the actual amount of pressure increase and/or pressure reduction or between the calculated amount of brake fluid supplied and the actual amount of brake fluid supplied. But once the brake is released, the master piston will return to its original position, so that communication between the master pressure chamber and the master cylinder reservoir is resumed and the entire system is reset. Thus, such a difference will have no undue influence on the next braking operation when the brake pedal is depressed again.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Now referring to FIGS. 1–4, the embodiments of this invention will be described.

Figure 1:
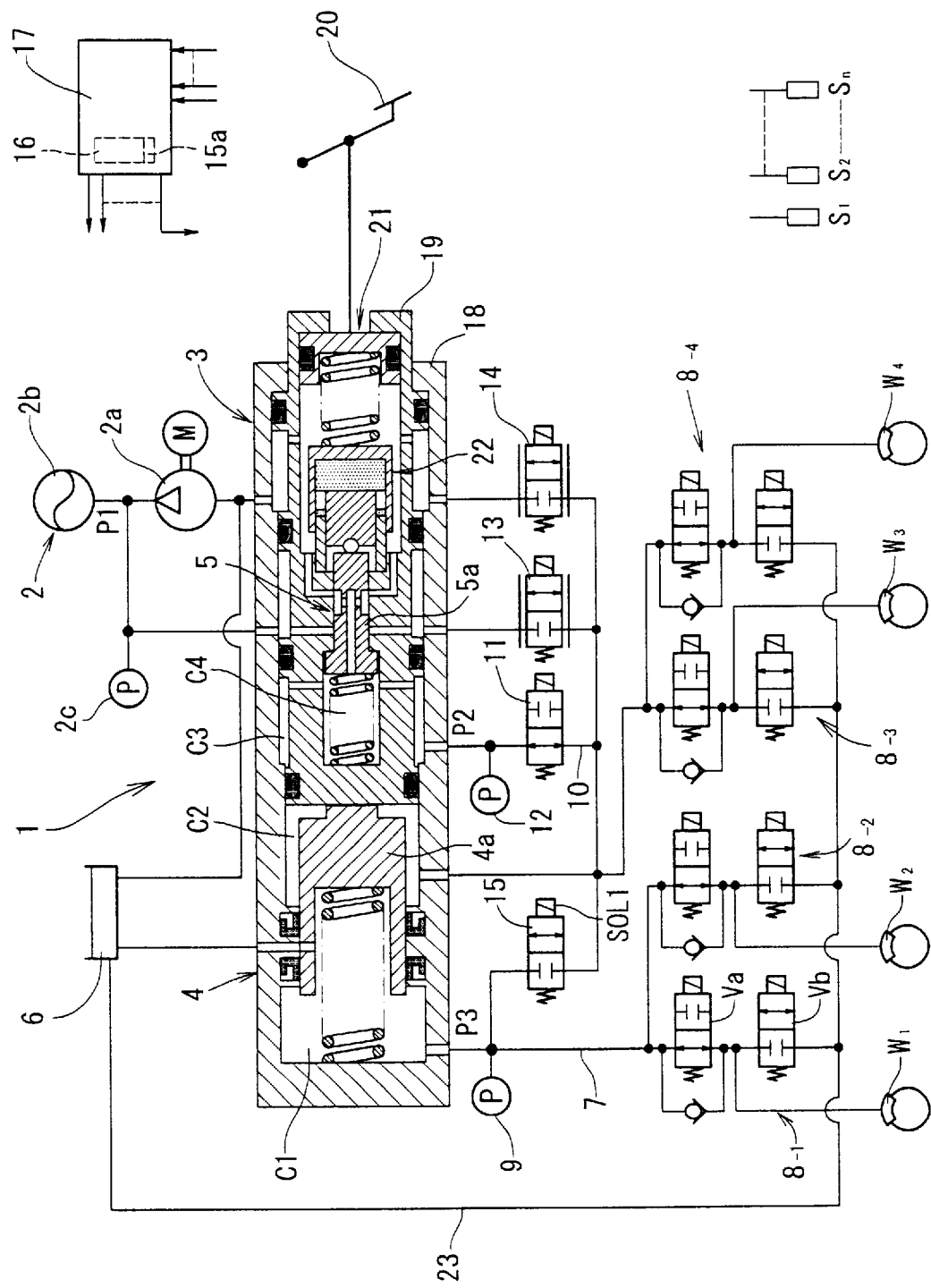
FIG. 1 is a view showing the entire configuration of the hydraulic brake system embodying the invention.

The hydraulic brake system 1 shown in FIG. 1 includes a hydraulic pressure source 2 having a power pump 2a, a pressure accumulator 2b and a pressure sensor 2c; a hydraulic pressure adjusting unit 3 including a master cylinder 4 and a pressure adjusting valve 5; an atmospheric reservoir 6 for supplying brake fluid to the hydraulic pressure source 2 and the master cylinder 4, and wheel cylinders $W_1$–$W_4$ for applying braking force to the respective vehicle wheels. The brake system 1 further includes wheel cylinder pressure control valves $8_{-1}$ and $8_{-2}$ and a pressure sensor 9 disposed in a first hydraulic line 7 that connects the master cylinder 4 to the wheel cylinders $W_1$ and $W_2$, and wheel cylinder pressure control valves $8_{-3}$ and $8_{-4}$, a solenoid valve 11 and a pressure sensor 12 disposed in a second hydraulic line 10 connecting the pressure adjusting valve 5 to the wheel cylinders $W_3$ and $W_4$.

The brake system 1 further includes two proportional solenoid valves 13 and 14 (which produce a differential pressure corresponding to an electronic command), a solenoid valve 15 disposed in a hydraulic line extending from an output port of the pressure adjusting valve 5 to the first hydraulic line 7, a controller (electronic control unit) 17 including a means 16 for estimating the amount of pressure increase and a control circuit 15a for the solenoid valve 15 (this circuit and the solenoid valve 15 constitutes a hydraulic pressure supply means), and various sensors $S_1$ to $S_n$ (belowmentioned pressure sensors included herein) for detecting the behavior of the vehicle and the status of the drive train and sending detection signals to the controller 17. The proportional solenoid valve 13 is disposed in a hydraulic line connecting the delivery port of the pump 2a to the hydraulic line 10 not through the solenoid valve 11. The proportional solenoid valve 14 is disposed in a pressure-reducing hydraulic line connecting the atmospheric reservoir 16 to the hydraulic line 10 not through the solenoid valve 11.

Figure 2:
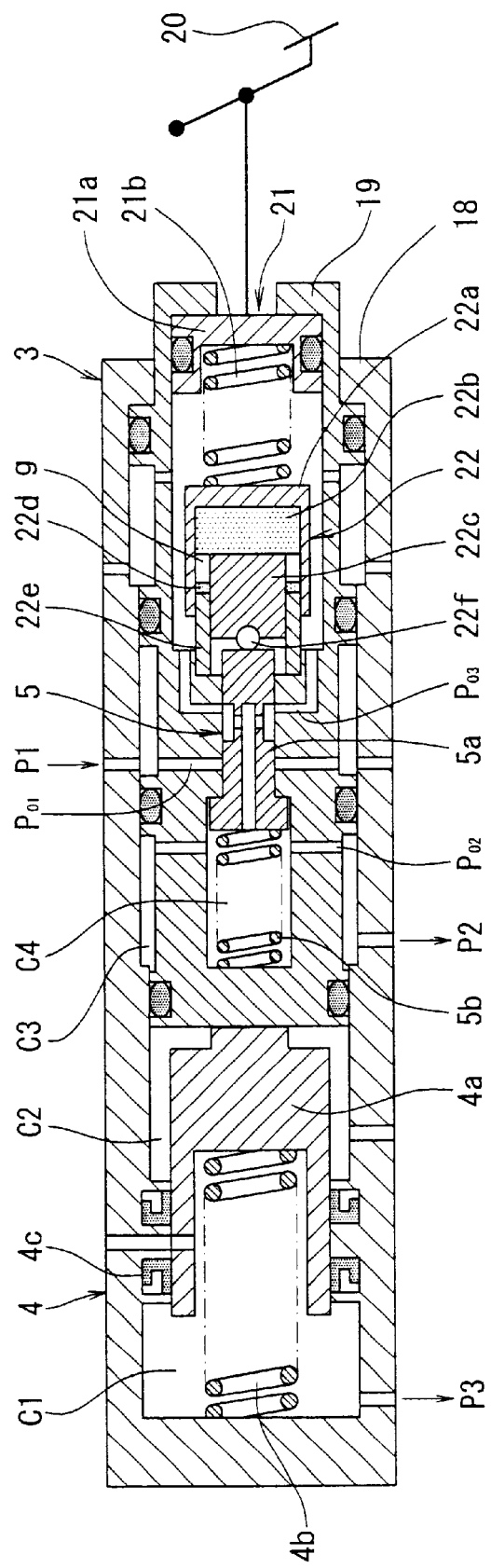
FIG. 2 is an enlarged sectional view of the hydraulic pressure adjusting unit of the brake system of FIG. 1.

FIG. 2 is an enlarged view of the hydraulic pressure adjusting unit 3. It includes a cylinder 18, an auxiliary piston 19 mounted in the cylinder 18, a stroke simulator 21 comprising a simulator piston 21a operatively associated with a brake operating member 20 (such as a brake pedal shown) and a biasing member 21b that imparts to the simulator piston 21a a stroke corresponding to the brake operation, and a distributor 22 for distributing the brake operating force applied thereto to the pressure adjusting valve 5 and the auxiliary piston 19 through the stroke simulator 21.

The master cylinder 4 comprises a master piston 4a having its front surface disposed in a master hydraulic pressure chamber C1 and its rear surface disposed in the pressure chamber C2, a return spring 4b for the master piston 4a, and a seal 4c for sealing the outer periphery of the piston 4a.

The pressure adjusting valve 5 includes a spool 5a to change over the increase, decrease and keeping of the output pressure. The spool 5a is adapted to move to a position where the sum of a thrust force corresponding to the hydraulic pressure in a pressure chamber C4 and the force of the return spring 5b balances with the force transmitted from the brake operating member 20 to the spool 5a through the distributor 22. The auxiliary piston 19 is formed with an input port $P_{O1}$, an output port $P_{O2}$ and a pressure reduction port $P_{O3}$. According to the position of the spool 5a, the output pressure at the output port $P_{O2}$ can be increased, reduced or maintained. That is, according to the position of the spool 5a, the output port $P_{O2}$ is selectively connected to the input port $P_{O1}$ or pressure reduction port $P_{O3}$ or to neither of them. While the input port $P_{O1}$ is in communication with the output port $P_{O2}$ through a passage in the spool 5a, the degree of opening of a valve portion defined between a shoulder of the spool 5a and the input port $P_{O1}$ is adjusted by slight movement of the spool 5a. Similarly, while the output port $P_{O2}$ is in communication with the pressure reduction port $P_{O3}$ through the passage in the spool 5a, the degree of opening of a valve portion defined between a shoulder of the spool 5a and the pressure reduction port $P_{O3}$ is adjusted by slight movement of the spool 5a. Thus, the hydraulic pressure P1 supplied from the hydraulic pressure source 2 is adjusted to a hydraulic pressure P2 corresponding to the force applied to the brake operating member 20 and the hydraulic pressure P2 is supplied to the wheel cylinders $W_3$ and $W_4$ through the fluid chambers C4 and C3. Since the pressure adjusting valve 5 is known in the art, its detailed description is omitted.

The force distributor 22 comprises a cup member 22a, a rubber disk 22b provided in the cup member 22a, a force transmission member 22c, a tubular member 22e having one end thereof supported by the auxiliary piston 19 and the other end carrying a resin ring 22d and inserted in the cup member 22a so as to oppose the rubber disk 22b with a gap g formed therebetween, and a steel ball 22f mounted to the force transmission member 22c so as to abut the spool 5a.

In the initial stage of brake operation, the force applied from the brake operating member 20 is transmitted only to the pressure adjusting valve 5 through the rubber disk 22b, transmission member 22c and steel ball 22f of the force distributor 22. When the brake operating force exceeds a threshold, the rubber disk 22b will be elastically deformed to fill the gap g, thus coming into contact with the resin ring 22d. Once the rubber disk 22b contacts the resin ring 22d, part of the brake operating force is transmitted to the auxiliary piston 19 through the tubular member 22e.

Since the brake operating force is transmitted only to the adjusting valve 5 in the initial stage of brake operation, it is possible to quickly increase the braking force, that is, to give jumping characteristics to the brake system. The inner diameter of the tubular member 22e and the outer diameter of the force transmission member 22c determine the ratio between the force transmitted to the pressure adjusting valve 5 and the force transmitted to the auxiliary piston 19. The lengths of these members determine the timing at which the distribution of the brake operating force starts. Thus, one or both of these parameters can be changed by replacing the tubular member 22e and the force transmission member 22c with ones having different diameters and/or different lengths.

In this regard, the force distributor 22 is a preferable element. But it may be omitted. If omitted, the brake operating force is directly transmitted to the pressure adjusting valve 5.

The auxiliary piston 19 is provided to directly transmit the brake operating force to the master piston 4a in case the hydraulic pressure source 2 or a line connecting thereto fails. The hydraulic pressure output from the pressure adjusting valve 5 is introduced into the pressure chamber C2 to push the auxiliary piston 19 rightwardly in the figure and keep it in the illustrated position. However, if the hydraulic pressure source 2 fails and no pressure is produced in the pressure chamber C2, the auxiliary piston 19 will be pushed leftwardly by the force transmitted from the brake operating member 20 through the force distributor 19, thus applying pressure to the master piston 4a. The hydraulic pressure thus produced in the master cylinder 4 is used to produce the braking force. Thus, even if the hydraulic pressure source 2 fails, it is still possible to apply brake.

The solenoid valve 11 and the proportional solenoid valves 13, 14 in FIG. 1 are provided to allow regenerative cooperative braking control and automatic brake control (such as vehicle stability control or car-to-car distance control), which does not depend on brake operation of a driver.

In regenerative cooperative brake control used in an electric vehicle, priority is given to regenerative braking. This means that while regenerative braking is on, it is necessary to reduce the braking force originating from hydraulic pressure by an amount corresponding to the regenerative braking force set for the wheels.

The controller 17 calculates the optimum regenerative braking force to be generated based on information from elements involved in regenerative braking, such as sensors, and controls the solenoid valve 11 and the proportional solenoid valves 13 and 14 so that the difference between the hydraulic pressure P2 in the fluid chamber C3, which is detected by the pressure sensor 12, and the hydraulic pressure P3 in the master hydraulic pressure chamber C1, which is detected by the pressure sensor 9, will be equal to the pressure corresponding to the calculated regenerative braking force.

With this arrangement, reduced hydraulic pressure is supplied to the wheel cylinders $W_3$ and $W_4$. Also, since due to this pressure reduction, the hydraulic pressure in the pressure chamber C2 also drops, the hydraulic pressure output of the master cylinder 4 will also drop, so that the braking force applied to the wheels by the wheel cylinders $W_1$–$W_4$ also drops by an amount corresponding to the regenerative braking force.

The auxiliary piston 19 has opposed pressure receiving surfaces that receive the pressure in the fluid chamber C3. Since the right pressure receiving surface is greater in area than the left pressure receiving surface, the piston 19 is kept in the position of FIG. 1 even during regenerative cooperative brake control unless the hydraulic pressure source 2 fails.

The proportional solenoid valve 13 permits automatic brake control, i.e. brake control with the brake not operated by the driver. In such automatic brake control, the controller 17 closes the solenoid valve 11 and opens the proportional solenoid valve 13 to apply hydraulic pressure output of the hydraulic pressure source 2 to the wheel cylinders $W_3$ and $W_4$. The hydraulic pressure also flows into the pressure chamber C2, so that the master cylinder 4 is also pressurized. This activates the wheel cylinders $W_1$ and $W_2$ which give braking force to the wheels.

Each of the wheel cylinder pressure control valves $8_{-1}$ to $8_{-4}$ shown comprises a solenoid valve Va having a check valve and adapted to open and close the line leading to the wheel cylinder, and a solenoid valve Vb for opening and closing the discharge line from the wheel cylinder. But instead of the valves Va and Vb, a single solenoid changeover valve having both functions may be used.

Brake fluid discharged from each wheel cylinder through the solenoid valve Vb flows through a discharge line 23 back to the atmospheric reservoir 6.

Thus, during antilock brake control, vehicle stability control, and other brake control which involve repeated pressure increases and reductions, the volume of the master hydraulic pressure chamber C1 tends to decrease gradually. This means that the master piston 4a gradually advances and will eventually abut the end wall of the cylinder 18, unless any preventive measures are taken. Once the master piston 4a abuts the end wall of the cylinder 18, no hydraulic pressure can be supplied from the master cylinder 4 any more.

In order to prevent the master piston from abutting the end wall of the cylinder 18, the hydraulic brake system 1 of FIG. 1 comprises means 16 for estimating the amount of pressure increase in the wheel cylinders $W_1$ and $W_2$, and the hydraulic pressure supply means (comprising the solenoid valve 15 and its control circuit 15a) for supplying the output pressure from the pressure adjusting valve 5 to the hydraulic line 7 according to the estimated amount of pressure increase.

Figure 5:
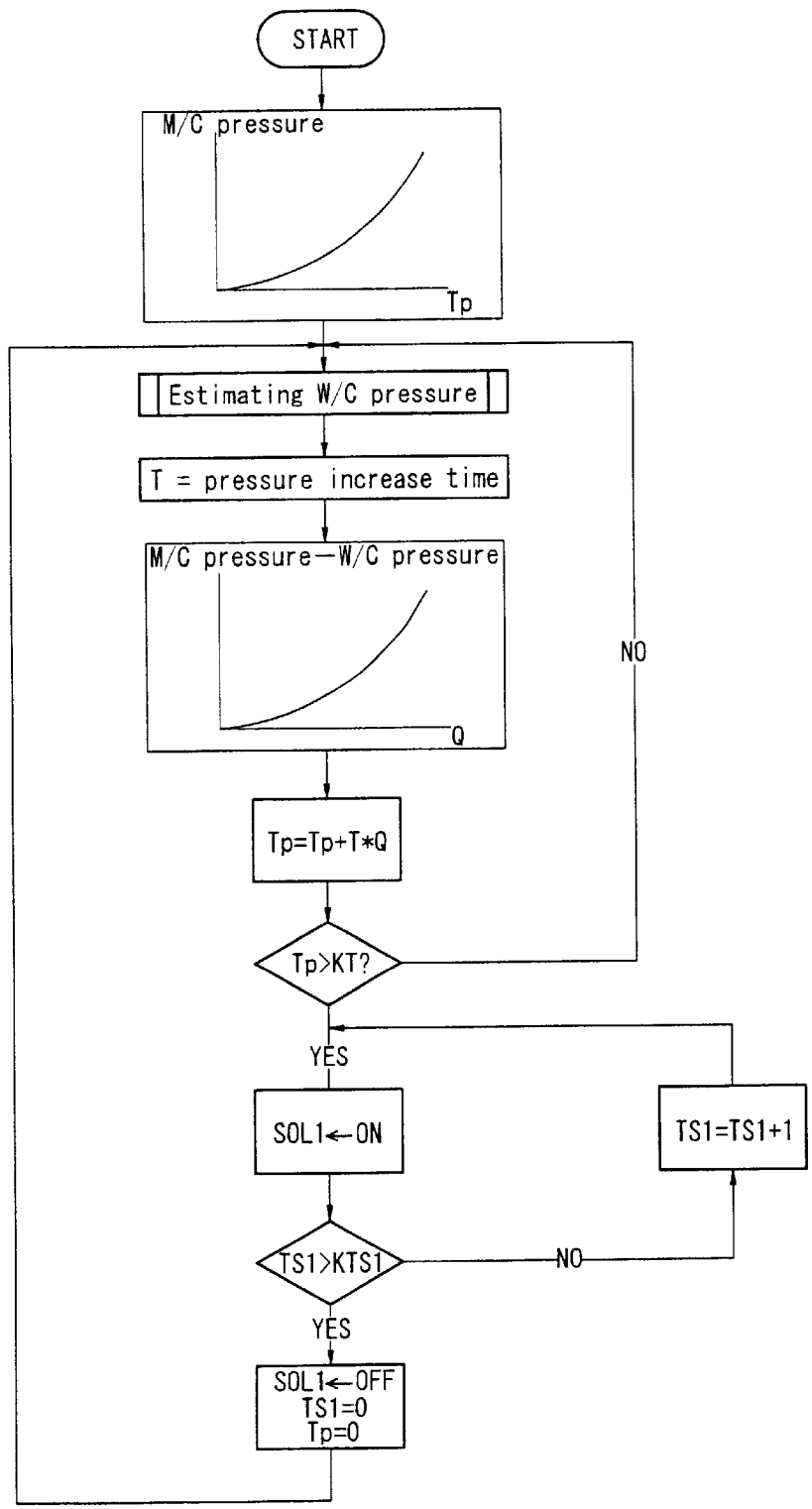
FIG. 5 shows a logic circuit for estimating the amount of pressure increase and controlling the supply of hydraulic pressure.

When control begins, as shown in FIG. 5, the means 16 substitutes the amount of pressure increase at the start of the control set as a function of the output fluid pressure of the master cylinder (M/C pressure) into the total amount of pressure increase Tp.

The means 16 also estimates the pressure in the wheel cylinders (W/C pressure). The W/C pressure is estimated from the pressure output of the master cylinder at the start of the control and the pressure increasing time and pressure decreasing time (time periods during which the solenoid valves Va and Vb are open, respectively) after the start of control.

Then, the total pressure increase amount Tp is calculated which is the accumulated value of the products of pressure increase times T and the pressure increase flow rates Q (amounts of pressure increase per unit time), which are set as a function of the difference between the M/C pressure and the estimated W/C pressure.

When the value Tp exceeds a preset threshold KT, the controller judges that the master piston has advanced to a predetermined position and turns on SOL 1 to open the solenoid valve 15 (FIG. 1).

When the time TS1 during which SOL 1 is ON (that is, time during which the solenoid valve 15 is open) exceeds a preset threshold KTS1, the controller turns off SOL 1 to close the solenoid valve 15 and reset the values TS1 and Tp.

Figure 3:
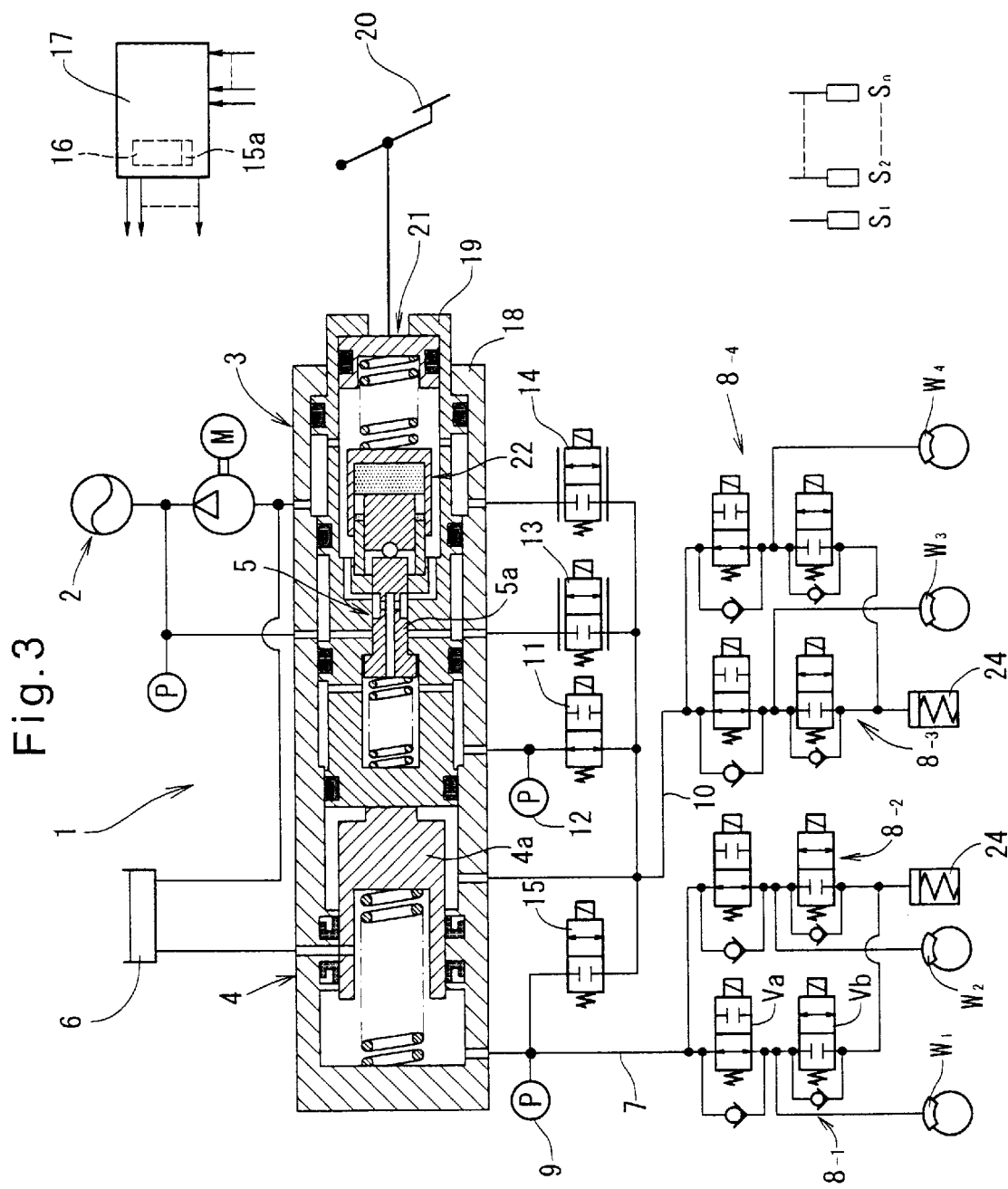
FIG. 3 is a view showing the hydraulic brake system of another embodiment.

The hydraulic brake system shown in FIG. 3 differs from that of FIG. 1 in that it further includes auxiliary reservoirs 24, the solenoid valves Vb for discharge are replaced with valves each having a check valve, and the discharge line (23 in FIG. 1) is omitted. Otherwise, this embodiment is structurally the same as the embodiment of FIG. 1. Thus, like elements are denoted by like numerals and description is omitted.

In the embodiment of FIG. 1, if the discharge line 23 is long, the piping will be expensive. In the embodiment of FIG. 3, instead of such an expensive discharge line, the auxiliary reservoirs 24 operating at low pressure are provided in each of the hydraulic lines 7 and 10 to temporarily store brake fluid discharged from the wheel cylinders. As the brake pedal is released, brake fluid in the auxiliary reservoirs 24 flows through the check valves of the solenoid valves Vb and the solenoid valves Va, which are now open, back to the master pressure chamber C1. The auxiliary reservoirs 24 should have a sufficient volume to store brake fluid discharged from the wheel cylinders after hydraulic pressure has been supplied from the pressure adjusting valve 5.

Figure 4:
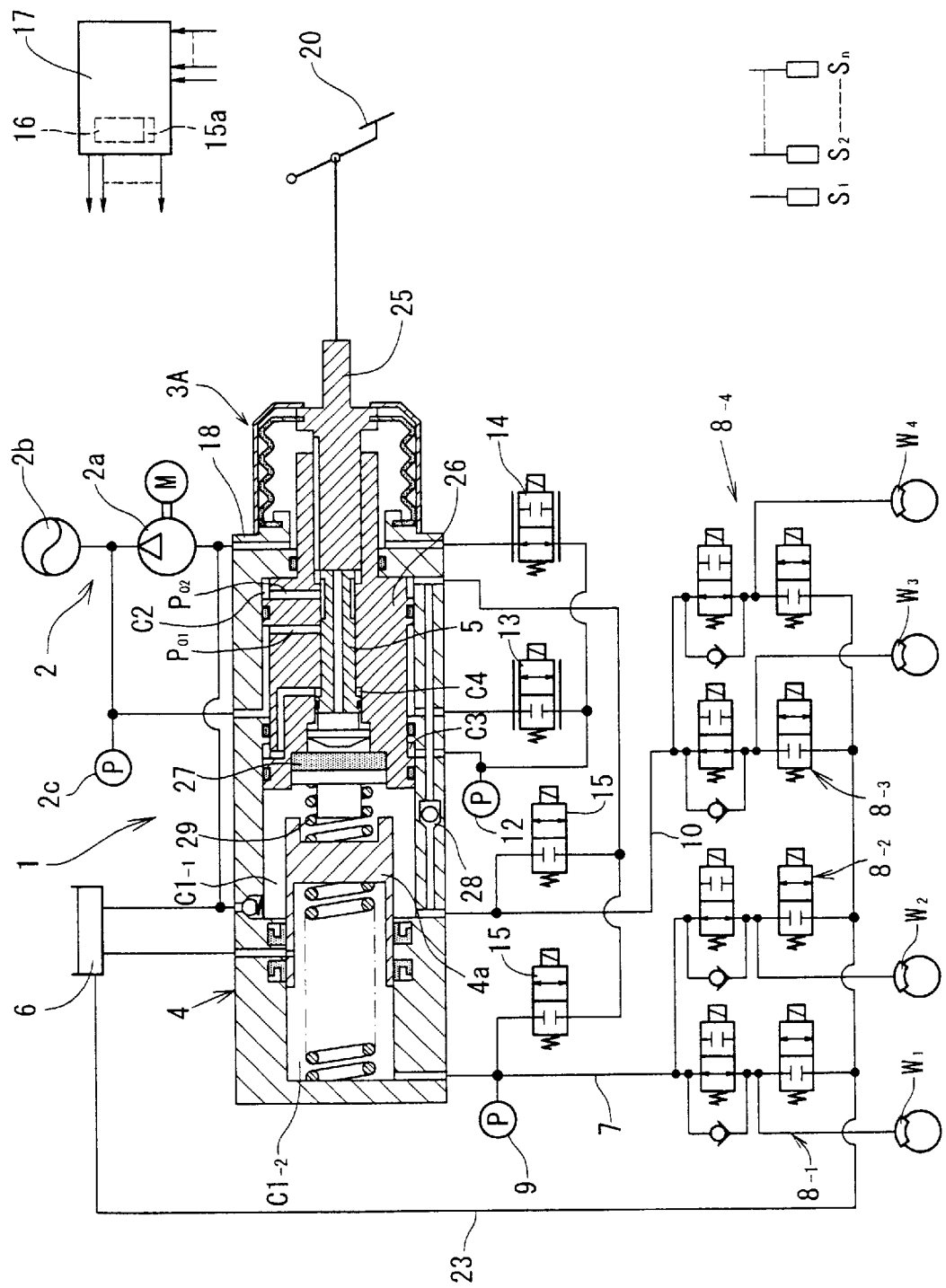
FIG. 4 is a view showing the hydraulic brake system of still another embodiment.

FIG. 4 shows a hydraulic brake system having a hydraulic pressure adjusting unit 3A including a tandem master cylinder. When the brake operating member or brake pedal 20 is depressed, force is transmitted through an input rod 25 to the pressure adjusting valve 5 to advance the valve 5 relative to a booster piston 26 until an input port $P_{O1}$ and an output port $P_{O2}$ formed in the booster piston 26 communicate with each other through an annular groove formed in the valve 5. Hydraulic pressure supplied from the hydraulic pressure source 2 is thus supplied to the output port $P_{O2}$.

The hydraulic pressure at the output port $P_{O2}$ is introduced into a pressure chamber C2 and is applied to the booster piston 26, which advances and closes the pressure adjusting valve 5. As the booster piston 26 advances, the pressure in the master pressure chamber $C1_{-1}$ increases, and the booster piston 26 stops at a point where the thrusting forces due to the pressures in the chambers C2 and $C_{-1}$ balance.

Since the pressure receiving surface of the booster piston 26 that receives pressure in the pressure chamber C2 is smaller than the pressure receiving surface of the piston 26 that receives pressure in the master pressure chamber $C1_{-1}$, the pressure in the pressure chamber C2 is set to be higher than the pressure in the master pressure chamber $C1_{-1}$ as long as hydraulic pressure is normally supplied from the hydraulic pressure source 2 into the pressure chamber C2. Thus, in this state, a check valve 28 provided in the line that connects the master pressure chamber $C1_{-1}$ with the pressure chamber C2 is closed.

In the initial stage of brake operation, the pressure adjusting valve 5 is spaced from a rubber disk 27 fitted in the booster piston 26. Thus, the valve 5 can be moved with a relatively light force in the initial stage of brake operation. Thus, it is possible to quickly increase the braking pressure in the initial stage of brake operation (jumping properties). When the valve 5 advances a predetermined distance, it abuts the rubber disk 27 and receives the reaction force due to the hydraulic pressure in the master pressure chamber $C1_{-1}$.

Hydraulic pressure produced in the master pressure chamber $C1_{-1}$ is introduced into wheel cylinders $W_3$ and $W_4$ through a second hydraulic line 10.

Hydraulic pressure in the master pressure chamber $C1_{-1}$ pressurizes the brake fluid in a master pressure chamber $C1_{-2}$ through a master piston 4a. The hydraulic pressure thus produced in the master pressure chamber $C1_{-2}$ is introduced into wheel cylinders $W_1$ and $W_2$ through the first hydraulic line 7.

In the embodiment of FIG. 4, if the hydraulic pressure source 2 fails, force applied to the brake pedal 20 is transmitted to the booster piston 26 through the input rod 25 to advance the piston 26. Since no pressure is being produced in the pressure chamber C2 in this state, the check valve 28 is opened by the pressure in the master pressure chamber $C1_{-1}$, so that the fluid therein will be discharged. This allows the booster piston 26 to further advance while compressing a return spring 29 provided between the booster piston 26 and the master piston 4a until it abuts the master piston 4a. Once the piston 26 abuts the piston 4a, the piston 26 pressurizes the brake fluid in the master pressure chamber $C1_{-2}$ through the master piston 4a. Thus, as with the brake systems shown in FIGS. 1 and 3, the system of FIG. 4 can also produce required braking force even if the hydraulic pressure source 2 fails.

While the system is functioning normally, the controller 17 can carry out automatic brake control. That is, it opens a proportional solenoid valve 13 and closes a proportional solenoid valve 14 to introduce hydraulic fluid from the hydraulic pressure source 2 through the valve 13 and the fluid chamber C3 into a fluid chamber C4. Pressure in the chamber C4 advances the pressure adjusting valve 5 until the input port $P_{O1}$ communicates with the output port $P_{O2}$. Hydraulic pressure from the hydraulic pressure source 2 is thus introduced into the pressure chamber C2. Hydraulic pressure thus produced in the pressure chamber C2 advances the booster piston 26, thus producing hydraulic pressure in the master pressure cylinders $C1_{-1}$, and $C1_{-2}$. During such automatic braking mode, too, the pressure in the pressure chamber C2 is adjusted by the pressure adjusting valve 5 such that the thrust force applied to the pressure adjusting valve 5 balances with the reaction force applied thereto through the rubber disk 27.

In order to compensate for shortage of brake fluid due to repeated pressure increase and reduction during antilock brake control, vehicle stability control and other automatic brake control, the hydraulic brake system of FIG. 4, too, is provided with a hydraulic pressure supply means comprising means 16 for estimating the amount of pressure increase, solenoid valves 15 and a control circuit 15a that are similar to those shown in FIGS. 1 and 3.

In the embodiment of FIG. 4 which uses a tandem master cylinder, if pressure increase and decrease are repeated, not only the master piston 4a but also the booster piston 26 advance, so that hydraulic pressure can drop to zero not only in the first line 7 but in the second line 10. Thus, two solenoid valves 15 are provided, each adapted to supply hydraulic pressure to one of the first and second hydraulic pressure lines 7 and 10.

The left (in FIG. 4) solenoid valve 15, which supplies the pressure output from the pressure adjusting valve 5 to the first line 7, and the right one 15, which supplies the pressure output from the pressure adjusting valve 5 to the second line 10, are controlled based on the estimated amount of pressure increase adjusted by the wheel cylinder pressure control valves in the first line, and on the estimated amount of pressure increase adjusted by the wheel cylinder pressure control valves in the second line.

The amount of pressure increase is estimated and hydraulic pressure corresponding to the estimated amount of pressure increase is supplied in the same manner as in the embodiment of FIG. 1.

Figure 6:
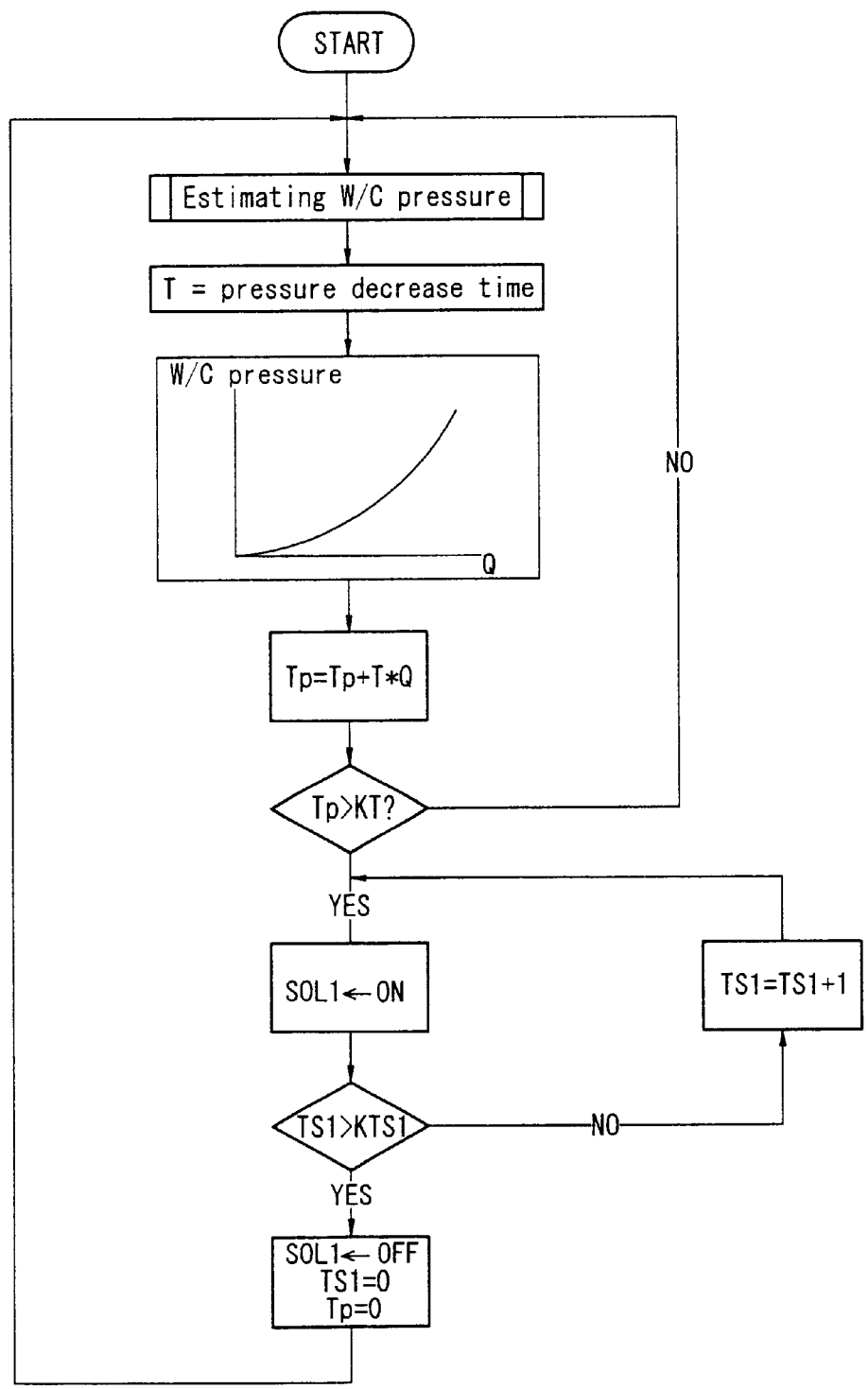
FIG. 6 shows a logic circuit for estimating the amount of pressure reduction and controlling the supply of hydraulic pressure.

In any of the hydraulic brake systems of the present invention, the means 16 for estimating the amount of pressure increase may be replaced with means for estimating the amount of pressure reduction as shown in FIG. 6. In the logic circuit of FIG. 6, when the control starts, the hydraulic pressure in the wheel cylinders (W/C pressure) is firstly estimated. The W/C pressure is estimated from the pressure output of the master cylinder at the start of the control, and the pressure increase time and pressure decrease time after the start of control.

Then a value Tp is calculated, which is the integrated value of the products of pressure decrease times T and the pressure decrease flow rates (amounts of pressure decrease per unit time), which are functions of the W/C pressure.

When the value Tp exceeds a preset threshold KT, the controller judges that the master piston has advanced to a predetermined position and turns on SOL1 to open the solenoid valves 15. The steps thereafter are the same as those shown in FIG. 5.

Hydraulic pressure may be supplied based on both the estimated amount of pressure increase and that of pressure reduction. In any of the brake systems of the embodiments, pressure output of the pressure adjusting valve 5 is supplied to the line from the master cylinder. But instead, pressure output from the hydraulic pressure source 2 may be supplied thereto.

According to the present invention, it is possible to eliminate the need for expensive solenoid valves and stroke sensors for the master cylinder as used in conventional systems such as those described in the prior art section.

What is claimed is:

1. A vehicle hydraulic brake system comprising a hydraulic pressure source for generating a predetermined hydraulic pressure, a pressure adjusting valve for adjusting the hydraulic pressure supplied from said hydraulic pressure source to a value corresponding to a brake operation and/or an automatic brake control, a master cylinder for generating hydraulic pressure according to brake operation and/or automatic brake control, wheel cylinders activated by the output pressure from said master cylinder to apply braking force to wheels of the vehicle, wheel cylinder pressure control valves provided in a hydraulic line connecting said master cylinder to said wheel cylinders for adjusting the hydraulic pressure in said wheel cylinders, characterized in that there are provided means for estimating the amount of pressure increase and/or pressure reduction adjusted by said wheel cylinder pressure control valves, and a hydraulic pressure supply unit for supplying hydraulic pressure output of said pressure adjusting valve into a hydraulic line connecting said master cylinder to said wheel cylinder pressure control valve according to the estimated amount of pressure increase and/or pressure reduction.

2. The hydraulic brake system claimed in claim 1 wherein said hydraulic pressure supply unit is adapted to supply hydraulic pressure to said hydraulic line when a piston of said master cylinder has advanced to a point near a full stroke position.

3. The hydraulic brake system claimed in claim 2 wherein said hydraulic pressure supply unit is adapted to supply hydraulic pressure into said hydraulic line so that a piston of said master cylinder retracts to a point near an initial position.

4. The hydraulic brake system claimed in claim 2 wherein said hydraulic pressure supply unit is adapted to supply hydraulic pressure into said hydraulic line so that a piston of said master cylinder moves to a predetermined position.

5. The hydraulic brake system claimed in claim 1 wherein said hydraulic pressure supply unit is adapted to supply hydraulic pressure into said hydraulic line so that a piston of said master cylinder retracts to a point near an initial position.

6. The hydraulic brake system claimed in claim 1 wherein said hydraulic pressure supply unit is adapted to supply hydraulic pressure into said hydraulic line so that a piston of said master cylinder moves to a predetermined position.

7. A vehicle hydraulic brake system comprising a hydraulic pressure source for generating a predetermined hydraulic pressure, a master cylinder for generating hydraulic pressure according to brake operation and/or automatic brake control, wheel cylinders activated by the output pressure from said master cylinder to apply braking force to wheels of the vehicle, wheel cylinder pressure control valves provided in a hydraulic line connecting said master cylinder to said wheel cylinders for adjusting the hydraulic pressure in said wheel cylinders, characterized in that there are provided means for estimating the amount of pressure increase and/or pressure reduction adjusted by said wheel cylinder pressure control valves, and a hydraulic pressure supply unit for supplying hydraulic pressure output of said hydraulic pressure source into a hydraulic line connecting said master cylinder to said wheel cylinder pressure control valve according to the estimated amount of pressure increase and/or pressure reduction.

8. The hydraulic brake system claimed in claim 7 wherein said hydraulic pressure supply unit is adapted to supply hydraulic pressure to said hydraulic line when a piston of said master cylinder has advanced to a point near a full stroke position.

9. The hydraulic brake system claimed in claim 7 wherein said hydraulic pressure supply unit is adapted to supply hydraulic pressure into said hydraulic line so that a piston of said master cylinder retracts to a point near an initial position.

10. The hydraulic brake system claimed in claim 7 wherein said hydraulic pressure supply unit is adapted to supply hydraulic pressure into said hydraulic line so that a piston of said master cylinder moves to a predetermined position.

* * * * *